United States Patent Office 3,140,152
Patented July 7, 1964

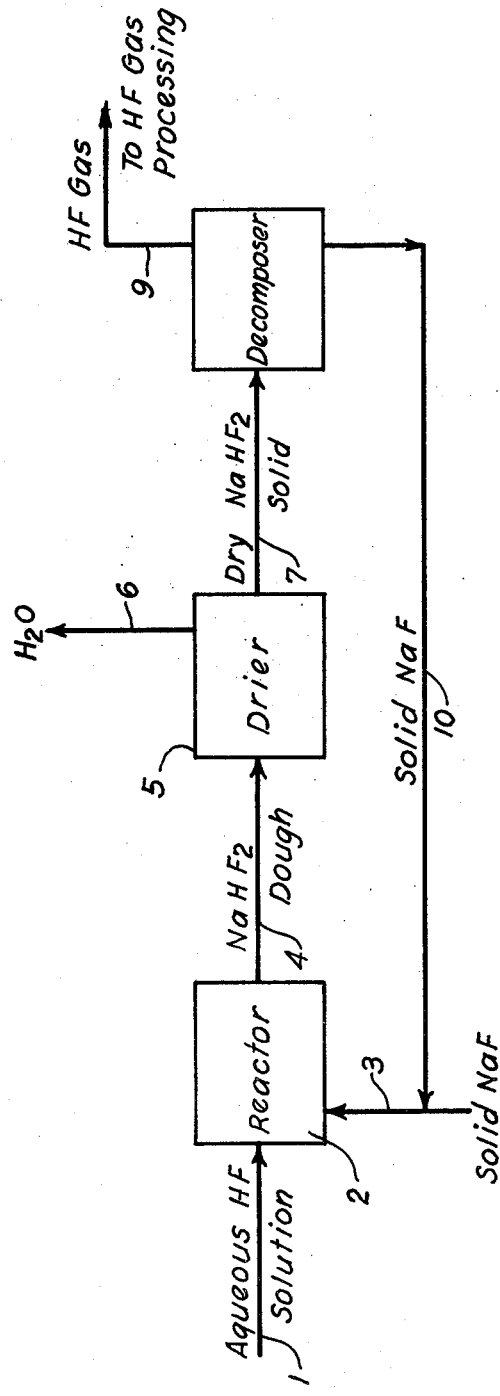

3,140,152
PROCESS FOR PREPARING AND RECOVERING OF SUBSTANTIALLY ANHYDROUS HYDROGEN FLUORIDE GAS FROM A DRY ALKALI METAL BIFLUORIDE
John T. Rucker and Theodore H. Dexter, Lewiston, N.Y., assignors to Hooker Chemical Corporation, Niagara Falls, N.Y., a corporation of New York
Filed June 29, 1962, Ser. No. 206,431
9 Claims. (Cl. 23—153)

This invention relates to the treatment of aqueous solutions of hydrogen fluoride and more particularly relates to the treatment of such solutions so as to obtain a substantially anhydrous gaseous hydrogen fluoride product.

In many industrial processes involving the manufacture or treatment of fluorine-containing compounds, the off gases resulting from these processes contain hydrogen fluoride. Inasmuch as the hydrogen fluoride is quite toxic, treatment of these gases to remove this material is necessary before the gases can be released to the atmosphere. In processes such as liquid phase fluorinations of hydrocarbons, acidulation and/or calcination of phosphate rock, as well as various processes in the aluminum industry wherein fluorine-containing gases are produced, the fluorines values in these gases are frequently obtained in the form of an aqueous solution of hydrofluoric acid.

While such aqueous solutions of hydrofluoric acid do have some utility, as for example in certain glass etching or metal cleaning compositions, the hydrogen fluoride values contained therein are preferably recovered as a gaseous hydrogen fluoride, which can be stored and shipped as a compressed and liquified gas. Such a material is easier to sell than is an aqueous solution of hydrofluoric acid and is of greater utility as a fluorinating reagent. Additionally, it is considerably cheaper to transport, in terms of cost per unit of hydrogen fluoride. Accordingly, numerous processes have heretofore been proposed to convert such aqueous solutions of hydrofluoric acid to gaseous hydrogen fluoride.

Exemplary of such recovery processes are those wherein it has been proposed to extract the hydrogen fluoride from an aqueous solution with an organic solvent. Thereafter, the organic layer is separated from the aqueous layer and the hydrogen fluoride distilled out of the organic solvent. Such a process involves difficulties, however, principally in the need for a non-reactive solvent and a solvent recovery system so that the solvent used in the extraction may be re-used in the process. Moreover, such a process still necessitates the use of a distillation step with its accompanying equipment and operational cost. Accordingly, up to the present time, no completely satisfactory processes have been available to obtain a substantially anhydrous hydrogen fluoride gas from aqueous solutions of hydrofluoric acid.

It is, therefore, an object of the present invention to provide an economical and efficient process for obtaining a substantially anhydrous hydrogen fluoride gas from an aqueous solution of hydrofluoric acid.

Another object of the present invention is to provide a process for obtaining a substantially anhydrous hydrogen fluoride gas from an aqueous solution of hydrofluoric acid, which process does not necessitate the use of numerous distillation and condensation steps.

These and other objects will become apparent to those skilled in the art in the description of the invention which follows.

The drawing which is attached hereto forms a part hereof is a schematic representation of a flow-process of a preferred embodiment of the present invention.

The method of the present invention envisions admixing an aqueous solution of hydrofluoric acid and a solid alkali metal fluoride, in a mole ratio of 1 HF to at least one alkali metal fluoride, effecting a reaction there between so as to form an alkali metal bifluoride, said bifluoride having at least some water associated therewith, removing the said water and forming a substantially dry alkali metal bifluoride, subjecting the thus dried alkali metal bifluoride to a temperature above the decomposition temperature thereof for a period of time sufficient to effect decomposition and form a solid alkali metal fluoride and a substantially anhydrous hydrogen fluoride gas, separating said gas and said solid and recovering the thus separated substantially anhydrous hydrogen fluoride gas.

It is to be understood that as used in the specification and claims, the term "alkali metal" is intended to include lithium, potassium, sodium, cesium and rubidium. Of these, the preferred alkali metal is sodium. Accordingly, because of their low cost and ready availability, primary reference will be made hereinafter to the compounds of sodium, e.g., sodium fluoride and sodium bifluoride. This is, however, merely exemplary of the present invention and is not to be taken as a limitation thereof.

More specifically in the present process, an aqueous solution of hydrofluoric acid is brought into contact and admixed with, in any convenient manner, a substantially dry, solid sodium fluoride. A reaction is effected between these materials so as to absorb the hydrogen fluoride from the aqueous solution in the sodium fluoride and convert it to sodium bifluoride. Because of the water present in the aqueous hydrofluoric acid solution used, the resulting sodium bifluoride which is produced will have some water associated therewith. Inasmuch as the molar ratio of the initial reactants used is one HF to at least one sodium fluoride, substantially all of the hydrogen fluoride will be absorbed from the aqueous hydrofluoric acid solution. Additionally, because of the heat of reaction involved in the reaction of the hydrogen fluoride and sodium fluoride, substantial quantities of the water in the aqueous hydrofluoric acid solution will be vaporized so that excessive amounts of water will not be present with the sodium bifluoride product produced. Generally, the sodium bifluoride product will be in the form of a thick slurry or a dough.

This dough is then dried to a sufficient extent to drive off substantially all of the water and produce a substantially dry sodium bifluoride material. The thus dried material is then subjected to a temperature in excess of its decomposition temperature, which temperature will generally be in excess of about 280° C. This temperature is maintained for a sufficient length of time so as to effect substantially complete decomposition of the sodium bifluoride and form sodium fluoride and a substantially anhydrous hydrogen fluoride gas. The thus obtained hydrogen fluoride gas may then be subjected to additional processing, in any conventional manner, to obtain a substantially anhydrous liquid hydrogen fluoride. The sodium fluoride which results from the decomposition of the sodium bifluoride may then be recycled in the process and introduced as at least a part of the initial reaction charge of sodium fluoride which is reacted with the aqueous solution of hydrofluoric acid.

With regard to the solutions of aqueous hydrofluoric acid which may be treated in accordance with the present invention, these solutions may be derived from any convenient source. As has been pointed out hereinabove, aqueous solutions of hydrofluoric acid may be obtained from processes such as the acidulation and/or calcination of phosphatic minerals. It has been found that the method of the present invention is particularly adapted for use in conjunction with processes of this type. In these processes, the off gases obtained from the acidulation and/or calcination of phosphatic minerals generally contain fluorine values and silicon values, as well as suspended solid impurities. Such off gases are then processed in any convenient manner to remove the suspended solid impurities and effect a separation of the silicon values and the fluorine values. The thus-separated fluorine values are generally in the form of an aqueous solution of hydrofluoric acid. This solution is then subjected to treatment in accordance with the process of the present invention.

As an example of a method by which such an aqueous solution of hydrofluoric acid may be obtained, reference is made to a copending application S.N. 197,078, filed on May 23, 1962. Briefly, the process of this application comprises treating the off gases obtained from the acidulation and/or calcination of phosphatic minerals so as to adjust the temperature, water content and total fluorine content of the gas and obtain a molar ratio of HF to $SiF_4$ in the gas of at least 5:1. Thereafter, the suspended solid impurities in the gas are removed and the gas is scrubbed with an aqueous solution, utilizing the sensible heat of the gas to effect a separation of the silicon values and the fluorine values in the gas. In this manner, a concentrated aqueous solution of hydrofluoric acid is obtained which is substantially free from all silicon values as well as other impurities. Such a solution is then advantageously treated in accordance with the method of the present invention.

The aqueous solution of hydrofluoric acid used in the process of the present invention may be of any desired concentration. Obviously, of course, more concentrated solutions are preferred. Where the hydrofluoric acid solution used is obtained by the method set forth in the copending application S.N. 197,078, as has been indicated hereinabove, the hydrogen fluoride concentrations of such solutions are generally within the range of about 25–35% by weight HF. Excellent results have been obtained in the present process using solutions of this concentration and for this reason, they are preferred. The present invention is not, however, to be limited to use of solutions of such concentration inasmuch as both lesser and more highly concentrated hydrofluoric acid solutions may be used.

The aqueous solution of hydrofluoric acid is admixed with the solid sodium fluoride in a molar ratio of one HF to at least one NaF. This may be carried out in any suitable reaction vessel, preferably equipped with suitable mixing or agitating means. While it is not essential to the process of the present invention that the solid sodium fluoride be agitated during the time of the addition of the aqueous hydrofluoric acid solution, such agitation is generally desirable in order to effect a more complete reaction between the hydrofluoric acid and sodium fluoride in a shorter period of time. Additionally, by agitating the reaction mixtures so as to maintain a substantially homogeneous condition, more complete utilization of the reactants are obtained, so that substantially all of the hydrogen fluoride values are absorbed from the hydrofluoric acid solution without the necessity for using a large excess of sodium fluoride.

The sodium fluoride used in the reaction may be in any suitable physical form. Generally, it is preferred that the sodium fluoride by crystalline in nature and have a particle size within the range of about 20 to about 350 mesh. The particle size of the sodium fluoride should preferably, not be extremely fine in that with such materials problems of dusting are encountered. Similarly, with extremely large particles of sodium fluoride settling of these particles into the center of the reaction mixture results, making it difficult to maintain a homogeneous mix. It is to be noted that although a pelletized sodium fluoride can be used in the present process, pellets are not necessary and may, in some instances, even be undesirable. For example, because the instant process involves the use of a liquid feed material, the surface of pellets in the reaction tends to become glazed with the liquid so that the available reactive sodium fluoride surface is greatly reduced. Accordingly, the use of sodium fluoride in a granular, crystalline form is generally preferred, although this is not to be taken in a limitation on the present process.

The reaction of the aqueous hydrofluoric acid solution and the solid sodium fluoride may be carried out at substantially any desired temperature. The only restriction as to the temperature is that it be above the freezing point of the hydrofluoric acid solution and below the decomposition point of the sodium bifluoride. It is to be noted that inasmuch as the sodium bifluoride obtained in this reaction is subjected to a subsequent drying step, it is not necessary that the reaction temperature for the formation of the sodium bifluoride be sufficiently high as to maintain the sodium bifluoride in a substantially dry condition. Inasmuch as the reaction between the hydrofluoric acid and the sodium fluoride is exothermic in nature, however, there will, obviously be some evaporation of water from the reaction mix, particularly when the hydrofluoric acid feed solution is of the preferred more concentrated type. Accordingly, it is preferred that no attempt be made to cool the reaction mixture during the reaction. Generally, the reaction temperature will be about 100° C., or perhaps somewhat less.

The reaction of the aqueous solution of hydrofluoric acid and the solid sodium fluoride to form sodium bifluoride, with the subsequent drying and decomposition of the sodium bifluoride, may be carried out in any convenient manner. For example, the aqueous solution of hydrofluoric acid, preferably at a temperature of about 75° C., may be admixed with the solid sodium fluoride to form a slurry or a pulp at a temperature of about 100° C. This slurry can then be transferred to a heated reactor equipped with a stirring mechanism, as for example, a ribbon blender, where it is heated externally to evaporate the water contained therein. The temperature of the reactor can then be raised to 280° C. or higher so as to decompose the dry sodium bifluoride.

As an alternative to this process, the slurry or pulp may be heated in a rotary kiln, by means of hot gases, so as to evaporate the water. The exhaust gases from the kiln are then scrubbed to recover any entrained dust. The dry sodium bifluoride formed in the kiln can then be transferred to a closed, externally heated reactor wherein it is decomposed at temperatures of 280° C. or above to form a gaseous hydrogen fluoride and solid sodium fluoride. This latter process lends itself very well to use in a continuous operation. As a further alternative to this latter process, two closed and externally heated reactors may be used in the process rather than a rotary kiln. In this manner, dusting in the first stage or drying portion of the process will be eliminated, thus making scrubbing of the gases from the reactor unnecessary. As a still further variation in the process, HF—$H_2O$ vapors, from a still or vaporizer, superheated if necessary, can be used in the kiln or closed reactor to evaporate water from the dough or pulp of sodium bifluoride-sodium fluoride crystals. In this manner, some additional sodium fluoride admixed with the sodium bifluoride will be converted to sodium bifluoride.

In yet another method of operating the process of the present invention, the aqueous hydrofluoric acid solution, preferably pre-heated to a temperature of about 75° C., is sprayed onto a moving, heated bed of sodium fluoride. The bed of sodium fluoride is preferably maintained at a temperature of about 125° C. In such an operation, the hydrogen fluoride will be absorbed preferentially to form sodium bifluoride and the water from the solution will be vaporized by the heat of the reaction as well as the heat of the bed. The exhaust gases from the bed, which are principally water vapor, are then scrubbed to recover any sodium fluoride-sodium bifluoride dust and hydrogen fluoride. The thus-obtained, substantially dry sodium fluoride-sodium bifluoride bed is then transferred to another moving bed reactor which is heated to a temperature above the decomposition temperature of the sodium bifluoride, e.g., 280° C., so as to evolve hydrogen fluoride.

In such a process, the first moving bed reactor may be heated by any one of a number of means. For example, the bed may be heated indirectly by external gas flames, hot flue gases or electrical resistance heaters. Alternatively, or additionally, the bed may be heated directly by hot combustion gases or superheated steam.

The second moving bed reactor is preferably heated by indirect means as for example, gas flames, hot flue gases or electrical resistance heaters which surround the reactor. In this manner, the collection of anhydrous HF gas is greatly simplified. Where, however, it is desired to obtain an aqueous hydrogen fluoride product, the use of direct heating such as superheated steam or hot gases may be used, although these will require the condensation or aqueous scrubbing of the hydrogen fluoride vapors. It will, of course, be appreciated that the above process can be carried out in a single moving bed, rather than two moving beds, merely by scheduling the heating of the bed so as to correspond to the hydrogen fluoride absorption and the hydrogen fluoride evolution stages of the process.

From the above, it is apparent that the present process may be operated in any of a number of ways with good results. The reaction of the hydrofluoric acid solution and the solid sodium fluoride may be accomplished in any suitable manner, using a comparatively low reaction temperature. The sodium bifluoride formed by this reaction, having some water associated therewith, may then be dried in any one of a number of ways, either as an integral part of the reaction step or in a subsequent, separate drying step. The thus obtained substantially dry sodium bifluoride is then decomposed by heating to an elevated temperature, preferably in excess of about 280° C., either as an integral part of the drying step or as a separate, subsequent decomposition step. The essence of the process is that an aqueous solution of hydrofluoric acid is reacted with a solid sodium fluoride to obtain a solid sodium bifluoride which may have some water associated therewith. This water is then removed by a drying operation and the substantially dry sodium bifluoride is decomposed to obtain a substantially anhydrous hydrogen fluoride gas and solid sodium fluoride. Such a process is advantageous in that the recovery of the hydrogen fluoride values as sodium bifluoride is quite high and the reaction of the solid sodium fluoride with the liquid aqueous hydrofluoric acid is substantially complete. Any water which is associated with the sodium bifluoride is removed at a comparatively low temperature, e.g., 100–125° C., where the vapor pressure of the hydrogen fluoride over sodium bifluoride is negligible. Moreover, in this process there is no dependence upon the reaction of the gaseous hydrogen fluoride with solid sodium fluoride. In view of this, problems of dusting in the reaction are virtually eliminated. The process is further advantageous in that theoretical amounts of sodium fluoride are used to react with the aqueous hydrofluoric acid so that no large excess of this material is required.

Considering now the drawings, this is a schematic representation of a preferred process of the present invention for recovery of substantially anhydrous hydrogen fluoride gas from an aqueous hydrofluoric acid solution. In this process, the aqueous hydrofluoric acid solution is introduced through the conduit 1 into the reactor 2. Similarly, solid sodium fluoride is introduced into the reactor 2 through the conduit 3. As has been pointed out hereinabove, the reactor 2 may be of any suitable design which will effect an adequate admixing of the aqueous hydrofluoric acid solution and the solid sodium fluoride. From the reactor 2, a damp sodium bifluoride dough is conducted through the conduit 4 to the dryer 5. Within the dryer 5, the moist sodium bifluoride is heated to the extent necessary to remove substantially all of the moisture. The water vapor, thus driven off from the sodium bifluoride, is removed from the dryer through the conduit 6. The thus obtained dry, solid sodium bifluoride is passed through the conduit 7 into the decomposer 8. The temperature within the decomposer is maintained above the decomposition temperature of the sodium bifluoride, e.g., above about 280° C. In this manner, decomposition of the substantially dry, solid sodium bifluoride is effected and a substantially anhydrous hydrogen fluoride gas is obtained. This hydrogen fluoride gas is removed from the decomposer through the conduit 9 and is found to be substantially pure and free of water. The gas may then be conducted to appropriate stills and condenser systems (not shown) for recovery of high purity liquid anhydrous hydrogen fluoride. The hot, solid sodium fluoride remaining in the decomposer 8 is then returned through the conduit 10 to the conduit 3 where it is re-introduced into the reactor 2 to be further contacted with the aqueous hydrofluoric acid solution.

It is to be understood that the sodium bifluoride material which is obtained in the reactor 2 and passed into the dryer 5 and then into the decomposer 8 may contain small quantities of unreacted sodium fluoride. Similarly, the sodium fluoride which is recycled from the decomposer 8 may also contain small amounts of undecomposed sodium bifluoride. In each instance, the presence of these small amounts of material are not found to be detrimental to the present process. Accordingly, it will be understood that where reference is made to the product from the reactor as being "sodium bifluoride" this material may also contain quantities of sodium fluoride. Similarly, when reference is made to the recycled reaction charge to the reactor as being "sodium fluoride" this reaction charge may also contain quantities of sodium bifluoride.

In order that those skilled in the art may better understand the method of the present invention and the manner in which it may be practiced, the following specific examples are given.

*Example 1*

To illustrate the recovery of gaseous hydrogen fluoride from an aqueous hydrogen fluoride solution, 67 grams of a hydrofluoric acid solution containing 30% HF is mixed with a solid, granular fluoride mixture containing 46 grams of sodium fluoride and 5 grams of sodium bifluoride. This mixture is recycled from a previous decomposition of sodium bifluoride. The reaction of the hydrofluoric acid solution and the sodium fluoride is carried out at a temperature of about 100° C. The slurry of sodium bifluoride obtained in this reaction is charged into a rotary kiln wherein it is dried at a temperature of about 125° C. The dry solid material obtained contains 67 grams of sodium bifluoride, representing a 100% recovery of the HF values from the aqueous hydrofluoric acid absorbed, and 4 grams of sodium fluoride. The water content of this material is less than 0.1% by weight. The dry sodium bifluoride solids are then heated in a closed, externally heated reactor to a temperature of about 320° C. 20 grams of a substantially pure, anhydrous hydrogen fluoride gas is evolved. This represents a substantially 100% recovery of the hydrogen fluoride values absorbed from the aqueous hydrofluoric acid solution. Additionally, 46 grams of sodium fluoride and 5 grams of sodium bifluoride are obtained which material is recycled to the reactor.

*Example 2*

A bed of 3 kg. of a crystalline dry sodium fluoride-sodium-bifluoride mixture, containing 72.4 mole percent of sodium fluoride, is maintained in a double sigma-blade mixer and heated to a temperature within the range of about 116 to 132° C. by means of electric resistance heaters. Into this moving bed is sprayed an aqueous solution of hydrofluoric acid, containing 30% HF. The hydrofluoric acid solution is added to the moving bed at the rate of 0.047 mole of HF per minute per mole of sodium fluoride in the bed. A total of 124 grams of the 30% hydrofluoric acid solution are added to the bed and it is found that 99.3 percent of the hydrogen fluoride values in the feed is absorbed. The water content of the bed at this point is found to be negligible. The thus obtained dry sodium bifluoride material is then heated to a temperature of about 310° C. and 37 grams of HF gas is evolved. This gas is substantially pure and free of water and represents a substantially 100% recovery of the HF values absorbed by the sodium fluoride bed.

While there have been described various embodiments of the invention, the methods described are not intended to be understood as limiting the scope of the invention as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. In a process for preparing a substantially anhydrous hydrogen fluoride gas by decomposing an alkali metal bifluoride formed by reacting an aqueous solution of hydrofluoric acid and an alkali metal fluoride, the improvement which comprises effecting the reaction between the hydrofluoric acid and the alkali metal fluoride by spraying an aqueous solution of hydrofluoric acid on heated particles of an alkali metal fluoride, the molar ratio of alkali metal fluoride to HF in the hydrofluoric acid being at least 1:1 and the temperature of the alkali metal fluoride particles, in conjunction with the temperature of the hydrofluoric acid solution, providing a reaction temperature of at least about 100 degrees centigrade but less than about 280 degrees centigrade, maintaining this reaction temperature for a period of time sufficient to evaporate at least a major amount of the water of the aqueous hydrofluoric acid solution and at least sufficient to form an alkali metal bifluoride having a dough-like consistency, the remaining water associated with the alkali metal bifluoride product being difficultly removable by filtration, forming a substantially dry alkali metal bifluoride, subjecting the thus-formed dry alkali metal bifluoride to a temperature above the decomposition temperature thereof for a period of time sufficient to effect decomposition and form an alkali metal fluoride and a substantially anhydrous hydrogen fluoride gas, separating said gas from the alkali metal fluoride and recovering the thus-separated substantially anhydrous hydrogen fluoride gas.

2. The process as claimed in claim 1 wherein the alkali metal fluoride is sodium fluoride and the alkali metal bifluoride is sodium bifluoride.

3. The process as claimed in claim 2 wherein the reaction of the aqueous hydrofluoric acid solution and the solid sodium fluoride is effected by spraying the hydrofluoric acid solution on a heated bed of sodium fluoride.

4. The process as claimed in claim 3 wherein the bed of sodium fluoride is maintained at a temperature of about 125° C.

5. The process as claimed in claim 4 wherein the reaction of the sodium fluoride and the hydrofluoric acid solution to form sodium bifluoride and the subsequent drying of the sodium bifluoride is carried out substantially simultaneously.

6. The process as claimed in claim 4 wherein the bed of sodium fluoride is made up of a granular crystalline sodium fluoride having a particle size within the range of about 20 to about 350 mesh.

7. The process as claimed in claim 2 wherein the decomposition of the sodium bifluoride is effected by heating to a temperature in excess of about 280° C.

8. The process as claimed in claim 2 wherein the sodium fluoride obtained from the decomposition of the sodium bifluoride is recycled to that point in the process wherein it is sprayed with the aqueous solution of hydrofluoric acid to form sodium bifluoride.

9. The process as claimed in claim 2 wherein the aqueous solution of hydrofluoric acid has an HF concentration within the range of about 25 to about 35%.

References Cited in the file of this patent
UNITED STATES PATENTS

| | | |
|---|---|---|
| 1,748,735 | Scott | Feb. 25, 1930 |
| 2,588,786 | Winter | Mar. 11, 1952 |
| 2,952,334 | Provoost et al. | Sept. 13, 1960 |
| 3,087,787 | Flemmert | Apr. 30, 1963 |